US006206276B1

United States Patent
Fang et al.

(10) Patent No.: US 6,206,276 B1
(45) Date of Patent: Mar. 27, 2001

(54) DIRECT-PLACEMENT FLUXLESS SOLDERING USING INERT GAS ENVIRONMENT

(75) Inventors: Lu Fang, Whitehall; Brian Dale Potteiger, Reading; Frederick W. Warning, Mertztown; Frederick Arthur Yeagle, Leesport, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,085

(22) Filed: Sep. 13, 1999

(51) Int. Cl.[7] .......................... B23K 20/14; B23K 31/02; B23K 35/38
(52) U.S. Cl. .............................................. 228/219; 228/42
(58) Field of Search .............................. 228/219, 42, 214, 228/218, 223

(56) References Cited

U.S. PATENT DOCUMENTS

| 3,680,200 |   | 8/1972 | Terrill et al. ........................... 29/500 |
|---|---|---|---|
| 4,034,468 | * | 7/1977 | Koopman .................................. 29/628 |
| 4,278,867 | * | 7/1981 | Tan ................................. 219/121 LD |
| 4,323,914 | * | 4/1982 | Berndlmaier et al. .................. 357/82 |
| 4,568,277 | * | 2/1986 | MacInnes et al. ..................... 432/120 |
| 4,836,434 | * | 6/1989 | Takenaka et al. ..................... 228/179 |
| 4,921,157 |   | 5/1990 | Dishon et al. ......................... 228/124 |
| 4,979,664 | * | 12/1990 | Lyons et al. ....................... 228/180.2 |
| 5,069,380 | * | 12/1991 | Deambrosio ............................ 228/42 |
| 5,139,193 |   | 8/1992 | Todd .................................. 228/180.2 |
| 5,223,691 | * | 6/1993 | Frei et al. ......................... 219/121.46 |
| 5,227,604 |   | 7/1993 | Freedman ......................... 219/121.63 |
| 5,255,840 |   | 10/1993 | Nowotarski ............................ 228/254 |
| 5,407,121 |   | 4/1995 | Koopman et al. .................... 228/206 |
| 5,427,303 |   | 6/1995 | Nowotarski ..................... 228/180.22 |
| 5,436,202 | * | 7/1995 | Miura .................................. 437/209 |
| 5,499,754 |   | 3/1996 | Bobbio et al. .......................... 228/42 |
| 5,572,065 | * | 11/1996 | Burns .................................... 257/666 |
| 5,604,831 |   | 2/1997 | Dittman et al. ......................... 385/88 |
| 5,615,086 | * | 3/1997 | Collins et al. ....................... 361/704 |
| 5,668,058 | * | 9/1997 | Tanioka et al. ...................... 438/108 |
| 5,783,464 | * | 7/1998 | Burns .................................. 438/112 |
| 5,801,073 | * | 9/1998 | Robbins et al. ..................... 438/125 |
| 5,829,665 |   | 11/1998 | Yoneyama et al. ............... 228/124.1 |
| 5,852,257 |   | 12/1998 | Dittman et al. ........................ 174/59 |
| 5,881,193 |   | 3/1999 | Anigbo et al. ......................... 385/93 |

* cited by examiner

*Primary Examiner*—Patrick Ryan
*Assistant Examiner*—Kiley Stoner
(74) *Attorney, Agent, or Firm*—Duane, Morris & Heckscher LLP

(57) ABSTRACT

A method for providing fluxless soldering without oxide formation includes mounting a component on a pedestal of a base. A housing is also mounted on the base, the housing and the base together define a closed cavity containing the component. An inert gas is introduced into the cavity to create an inert gas-rich environment. Thereafter, the cavity is heated sufficiently to reflow solder provided between the component and the housing, to join the component to the housing without the formation of additional oxides on the solder joint.

4 Claims, 2 Drawing Sheets

DIRECT-PLACEMENT FLUXLESS SOLDERING USING INERT GAS ENVIRONMENT

FIELD OF THE INVENTION

The present invention relates generally to soldering methods for electronic devices, and more particularly to methods of fluxless soldering.

BACKGROUND OF THE INVENTION

During a typical solder operation, typically two (2) components are mechanically attached to each other with a metal material called solder. The process requires that the components are placed together with the solder placed in the area where the attachment is to occur. The components are heated to a temperature to melt (reflow) the solder. When the solder melts the liquid solder attaches metallurgically to the components. Liquid solder (like all metals) instantaneously forms an oxide. Oxide layers form on the exterior of the solder forming a "crust" or film which in some cases is very difficult to penetrate or break. If the oxide layer is not removed or broken the solder joint will be very poor. The components and solder are cooled to a temperature below which the solder solidifies, thus creating a solder joint.

Typically, soldering processes include three basic steps: (1) pre-cleaning and deoxidation of surface oxides; (2) solder reflow and/or reflow joining; and (3) post-soldering cleaning. Different flux materials are used in the pre-cleaning step to prepare the surfaces for the soldering step by removal of contaminants and metal oxides from the solder surface (flux is a chemical formulated to remove oxides and prevent oxidation prior or during the soldering process). For example, activated fluxes, such as zinc, ammonium chloride, mineral acid-containing materials, and the like, are typically used in "coarse" soldering applications, e.g., repairing coarse wiring in motors or houses. The solder joining step can occur only after the oxide coating is removed because the high melting point oxides prevent wetting of the two surfaces to be joined by reflow of solder. The third step, post-soldering cleaning, removes flux residue remaining after the reflow.

Highly acidic fluxes are used for the soldering of aluminum layers. Aluminum has a tenacious oxide layer which is chemically very inert and difficult to remove. Thus, mild rosin fluxes are ineffective with aluminum and special fluxes containing acid compounds which are highly corrosive, such as inorganic acids in a cadmium fluoroborate vehicle, must be used. Fluxes used with aluminum can also contain metal chlorides, fluorides, and ammonium compounds.

Because of the gross corrosive nature of these fluxes, and the high attack rates on metals in microelectronic assemblies, such fluxes cannot be used in microelectronics. For microelectronic devices, the standard practice is to reduce the acid activity of the flux to a mildly activated or non-activated grade in an attempt to minimize the adverse effects of the flux on the components. Typical soldering processes for copper layers in microelectronic applications use rosins which form a very mild organic acid when melted at the soldering temperature but which are relatively inert at room temperature.

Although corrosion and other risks can be minimized in copper soldering applications using mild flux agents, flux is necessary to keep the solder from oxidizing, allow it to flow and wet the parts being soldered. In addition, with the shrinking size of all electronic components and bonding pads, the rapidly growing use of surface mount technology, and the increasing demand for flip-chip device bonding, the post reflow cleaning of flux residues is becoming increasingly difficult. The small gaps between assembled parts, and solidification cavities in mixed soldered joints are very resistant to penetration by cleaning liquids. Inefficient post-soldering cleaning can reduce the long term reliability of the whole assembly. Further, there can be other problems associated with non-activated or mildly activated flux processes, such as higher defect levels and high rework costs. Opto-electronic devices are also very sensitive to flux residues due to absorption and bending of the optical signals.

In a typical soldering procedure, the flux residue needs to be removed through a cleaning process. Many previous cleaning solvents such as Freon can no longer be used due to environmental concerns. Great efforts have been made to develop replacement solvents but the ultimate solution is to solder without the use of flux, i.e., fluxless soldering. Fluxless soldering is a method of soldering components together using a variety of different solders without the use of a flux.

An exemplary method to perform fluxless soldering typically involves a mechanical "scrubbing" of the components after the solder has melted to mechanically break the oxide on the solder. This method can be fixture-intensive, mechanically stresses the components, and provides a marginal solder joint. Another method is the use of batch-type equipment such as a DAP furnace which requires the components to be assembled or fixtured and then placed into a chamber which is sealed, evacuated, and back-filled with an inert (oxygen-free) gas. The assemblies are heated and cooled and then removed from the chamber. This method is usually capital and floor space intensive, as well as a batch operation.

SUMMARY OF THE INVENTION

The invention provides a system and method for providing fluxless soldering. In a method according to the invention, a component is mounted on a pedestal formed on a base. A package is mounted on the base, the package and the base together define a closed cavity containing the component. An inert gas is introduced into the cavity to create an inert gas-rich environment. Thereafter, the package is heated sufficiently to reflow solder provided between the component and the housing, to join the component to the package without formation of oxides on the solder joint.

Another aspect of the invention is a system for fluxless soldering including: a housing having four side walls and a bottom wall, each side wall having a free edge; and a base having a peripheral channel for receiving the free edges of the side walls, the base and the housing defining a closed cavity, the base having a pedestal within the peripheral channel for supporting a component, and a gas inlet for introducing an inert gas into the cavity.

BRIEF DESCRIPTION OF THE DRAWINGS

Other objects, advantages and novel features of the invention will become more apparent from the following detailed description of the invention when considered in conjunction with the accompanying drawings wherein.

DESCRIPTION OF THE PREFERRED EMBODIMENTS

Figure 1:
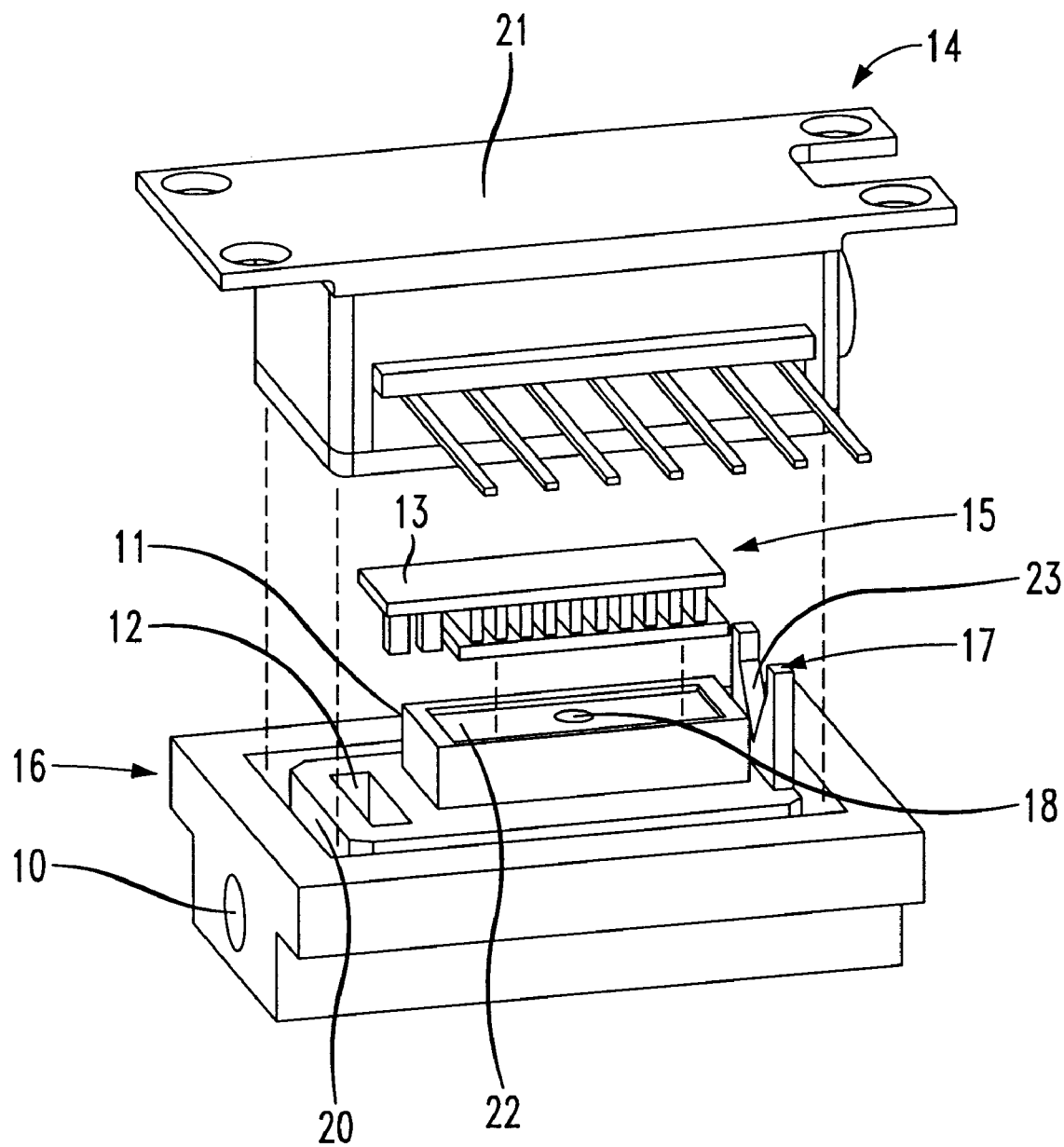
FIG. 1 is an exploded assembly view of a direct placement fluxless soldering system according to the invention.
Figure 2:
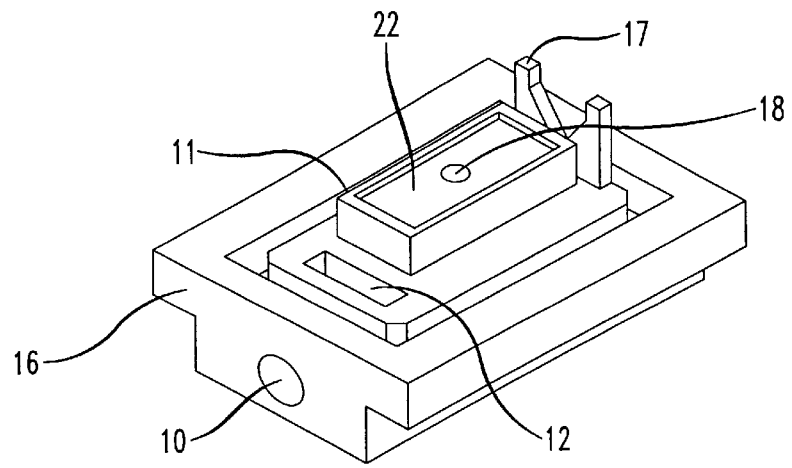
FIG. 2 is an isometric view of the base shown in FIG. 1.
Figure 3:
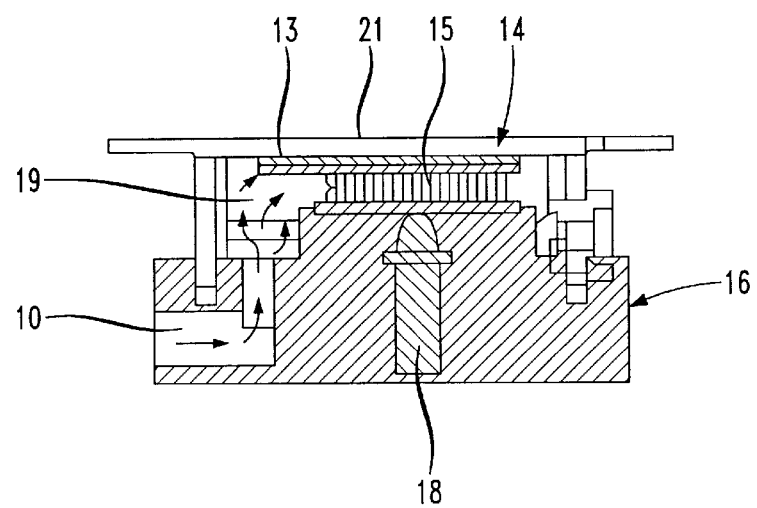
FIG. 3 is a cross sectional elevation view of the direct placement fluxless soldering system of FIG. 1.
Figure 4:
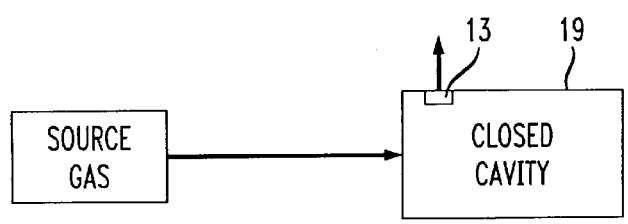
FIG. 4 is a block diagram of a system for fluxless soldering according to the invention.

Referring now to the drawings wherein like reference numerals designate like parts in each of the respective drawings, FIG. 1, shows a direct placement fixture (the "base") 16, that detachably engages the open end of a package (or "housing") 14, wherein the base 16 and the package 14 together define a closed cavity 19. The cavity 19 is saturated with an inert gas to create a shielded environment, as the assembly is heated to solder a discrete component 15 to the package (housing) 14, in a fluxless environment, while avoiding the formation of oxides.

In the exemplary embodiment shown, package 14 (shown in an inverted orientation) is a machined metal box-like structure, having four sidewalls and a bottom 21 which together define an interior chamber or cavity 19 that is accessible from the top of the package. The interior chamber 19 is shaped to receive one or more discrete components 15.

Base 16 is machined from a block of insulating material such as a high temperature plastic, and preferably is formed of "VESPEL™", a product available from Dupont Corporation of Wilmington, Del. In the alternative, the base 16 may be formed of ceramics, metals or other suitably rigid materials. The base 16 serves as a platform on which package 14 is temporarily mounted 19 in order to provide a closed cavity 19 to create a shielded environment for soldering a component 15 to the interior surface of package 14.

The top of base 16 includes a peripheral channel 20 which is shaped to receive and orient the free edges of the four side walls of the package 14. A pedestal 11 is also provided on the top surface of the base 16, within channel 20, and includes a recess 22 which is shaped to receive and orient a component 15 with respect to the interior of package 14. A gas inlet 10 is provided on base 16, through which an inert gas (e.g., nitrogen, helium or argon gas) is introduced into the cavity 19 of the system. The direct placement approach of the present invention uses the cavity 19, or the inside of the package 14 as the "can" or housing, with the inert gas supply directed into the cavity 19 via aperture 12.

The base 16 includes an alignment fixture 17 and clamping device 18 that together provide proper fit and alignment of the resulting individual components of the system. Alignment fixture 17 uses external features of component 15 and internal features of package 14 to provide proper alignment and orientation of the component 15 with respect to the package 14. In the exemplary embodiment, the alignment fixture 17 is a vertically extending flange having a substantially V-shaped cutout for receiving a mating structure (not shown) provided on the interior of package 14. Clamping device 18 may be, for example, a spring-loaded pin provided in pedestal 11, that provides a force on component 15 to maintain contact with the floor of the package 14 during soldering. It will be appreciated that other alignment and clamping fixtures are contemplated within the scope of the invention, and may be desirable, depending on the particular application and the size and shape of both the packages 14 and corresponding components 15.

A direct placement fixture or base 16 in accordance with the invention is used to solder a component 15 to a package 14 as follows. A component 15 is positioned in recess 22 on pedestal 11 of the base 16. A solder preform 13 is provided on a surface of the component 15 for joining the surface to the package 14. Thereafter, package 14 is placed over the component 15, and the free edges of the package walls are engaged with channel 20 of the base 16, to effectively seal off cavity 19. An external force may be applied to the package 14 to maintain a sealing engagement with the base 16. At this stage of assembly, the component 15 is located within the closed cavity 19, and the solder 13 is sandwiched between component 15 and package 14, as the clamping device 18 exerts a force on the component 15, pressing it against the bottom of package 14.

Following assembly of the respective components, an inert gas is introduced into cavity 19. The interface between the package 14 and the direct placement fixture 16 is a "seal" which does not allow inert shield gas to escape. As inert gas enters the direct placement fixture via inert gas inlet 10 and through aperture 12 into cavity 19, it fills the cavity, and is only allowed to escape through a small "vent" or inert gas outlet (25). This allows the shield gas to fill and persist in the cavity, thus providing a "blanket" or environment of inert gas, substantially devoid of other materials. The inert gas is constantly flowing in the fixture in order to displace or purge oxygen that may initially be present in the system. The presence of inert gas exclusive of other materials serves to provide an oxygen-free environment, i.e., the inert gas provides a "shield" or environment around the parts to be soldered to inhibit the formation of oxide on the solder.

After the cavity 19 is charged with an inert gas, the cavity is heated to a temperature sufficient to reflow the solder 13 that is provided between the mating surfaces of the component 15 and the package 14. In a preferred embodiment, heat is applied to the package 14 to elevate the cavity 19 temperature, and the base 16 is formed of an insulating material to avoid excessive dissipation of the heat provided in the cavity 19. Alternatively, the fixture 16 (or the base thereof) may be heated to heat the cavity.

Advantageously, the oxygen free cavity 19 allows the formation of a solder joint between the component 15 and the package 14 without the use of fluxes, and/or mechanical scrubbing, while avoiding the formation oxides on the solder joint. Note the portions of the system may have some insubstantial amounts of oxide on them before the component 15 is placed in the fixture 16 for soldering. The exemplary system, however, operates without formation of any additional oxide that was not previously present.

The exemplary system provides a direct placement fixture 16 that attaches to an existing package 14 to form a closed cavity 19 that can be charged with an inert gas to facilitate fluxless soldering of one or more components 15 to the package 14. The configuration allows for top-down loading of components 15 and packages 14 onto the direct placement fixture 16 which orients and aligns the component 15 with respect to package 14. The top-down loading configuration is particularly suited for an automated production environment, wherein robotic arms may be used to position components and packages on direct placement fixtures which are then charged with an inert gas and heated to effect soldering.

While this invention has been described with respect to particular embodiments thereof it is not limited thereto. The scope of the invention includes numerous other forms and modifications of the exemplary embodiments which may be made by those skilled in the art. The appended claims should be construed to cover all such forms and modifications that are within the true spirit and scope and range of equivalents of the present invention.

We claim:

1. A method for creating fluxless soldering joints, without oxide formation, comprising the steps of:

mounting a component on a base;

mounting a package of the component on the base, the base and the package together defining a closed cavity, the component being contained within the cavity;

introducing an inert gas into the closed cavity, to create an inert gas-rich environment;

allowing inert gas to exit the closed cavity; and heating the package sufficiently to reflow solder provided between the component and the package to form a solder joint between the component and the package, substantially without formation of oxides.

2. The method as recited in claim 1 wherein said inert gas-rich environment prevents oxide from forming on the solder or base metals during the heating process.

3. The method as recited in claim 1 wherein said inert gas is selected from a group consisting of nitrogen, helium and argon.

4. The method as recited in claim 1 further comprising aligning and clamping the component on the base.

\* \* \* \* \*